(12) United States Patent
Taniguchi et al.

(10) Patent No.: US 9,583,985 B2
(45) Date of Patent: Feb. 28, 2017

(54) DC COMMUTATOR MOTOR AND AUTOMOBILE INCLUDING THE SAME

(71) Applicant: Hitachi Automotive Systems, Ltd., Hitachinaka-shi, Ibaraki (JP)

(72) Inventors: Tsukasa Taniguchi, Hitachi (JP); Hidefumi Iwaki, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 505 days.

(21) Appl. No.: 13/857,469

(22) Filed: Apr. 5, 2013

(65) Prior Publication Data

US 2013/0264904 A1 Oct. 10, 2013

(30) Foreign Application Priority Data

Apr. 10, 2012 (JP) .................................. 2012-089633

(51) Int. Cl.
*H02K 3/28* (2006.01)
*H02K 23/36* (2006.01)
*H02K 23/38* (2006.01)

(52) U.S. Cl.
CPC ............... *H02K 3/28* (2013.01); *H02K 23/36* (2013.01); *H02K 23/38* (2013.01)

(58) Field of Classification Search
CPC .......... H02K 1/00; H02K 23/00; H02K 23/26; H02K 3/28; H02K 23/02; H02K 23/08; H02K 13/04; H02K 23/36; H02K 23/38
USPC .................................. 310/179, 184, 188, 198
IPC ....................................................... H02K 3/28
See application file for complete search history.

(56) References Cited

U.S. PATENT DOCUMENTS

| | | | | |
|---|---|---|---|---|
| 3,418,991 A | * | 12/1968 | Gelenius | B60K 15/00 123/179.1 |
| 5,934,600 A | * | 8/1999 | Darceot | H02K 3/28 242/433 |
| 6,170,974 B1 | * | 1/2001 | Hyypio | 716/136 |
| 6,683,396 B2 | * | 1/2004 | Toyama | B25F 5/00 310/130 |
| 6,737,779 B2 | * | 5/2004 | Natsuhara | H02K 23/36 310/136 |
| 7,619,344 B2 | * | 11/2009 | Osawa | H02K 23/28 310/198 |
| 8,079,133 B2 | * | 12/2011 | Roos | H02K 23/30 29/598 |
| 8,125,117 B2 | * | 2/2012 | Zhao | H02K 23/30 310/198 |
| 9,033,117 B2 | * | 5/2015 | Ma | B60T 13/741 188/157 |

(Continued)

FOREIGN PATENT DOCUMENTS

JP 2007-151268 A 6/2007

*Primary Examiner* — John K Kim
(74) *Attorney, Agent, or Firm* — Volpe and Koenig, P.C.

(57) ABSTRACT

A DC commutator motor includes a yoke, a field magnet, and an armature. A shaft is positioned on a central axis of the armature. A plurality of commutator segments is positioned in a circumferential direction of the shaft. A plurality of armature slots is formed on an outer periphery of an armature core. An upper coil is wound the number of turns Na through two armature slots, which are located apart from each other with the predetermined number of armature slots therebetween, at their opening sides. A lower coil is connected in parallel with the upper coil and wound the number of turns Nb through the two armature slots at their bottom sides. The number of turns Na is smaller than the number of turns Nb.

7 Claims, 9 Drawing Sheets

(56) References Cited

U.S. PATENT DOCUMENTS

| | | | | |
|---|---|---|---|---|
| 2003/0057788 A1* | 3/2003 | Natsuhara et al. | | 310/179 |
| 2003/0127932 A1* | 7/2003 | Ishida | | H02K 23/36 |
| | | | | 310/184 |
| 2004/0012291 A1* | 1/2004 | McLennan | | H02K 3/12 |
| | | | | 310/180 |
| 2004/0100160 A1* | 5/2004 | Potocnik | | 310/236 |
| 2006/0220489 A1* | 10/2006 | Osawa | | H02K 23/28 |
| | | | | 310/198 |
| 2007/0069602 A1* | 3/2007 | Ito et al. | | 310/233 |
| 2007/0247014 A1* | 10/2007 | Schach et al. | | 310/184 |
| 2008/0258574 A1* | 10/2008 | Santo | | H02K 13/08 |
| | | | | 310/177 |
| 2009/0189473 A1* | 7/2009 | Castle et al. | | 310/186 |
| 2010/0013361 A1* | 1/2010 | Zhao | | H02K 23/38 |
| | | | | 310/40 MM |
| 2010/0084941 A1* | 4/2010 | Miyajima | | H02K 13/04 |
| | | | | 310/198 |
| 2012/0313492 A1* | 12/2012 | Yamada | | H02K 1/24 |
| | | | | 310/68 D |

* cited by examiner

| CASE | COIL POSITION | NUMBER OF TURNS | INDUCTANCE $L_1, L_2$ [$\mu$H] | COMBINED INDUCTANCE $L_p$ [$\mu$H] | COIL RESISTANCE $R_1, R_2$ [m$\Omega$] | COIL COMBINED RESISTANCE $R_p$ [m$\Omega$] |
|---|---|---|---|---|---|---|
| ① | UPPER | 12 | 40.3 | 21.4 | 32.9 | 11.8 |
|   | LOWER | 8 | 45.7 |  | 18.5 |  |
| ② | UPPER | 11 | 33.9 | 21.4 | 29.3 | 12.6 |
|   | LOWER | 9 | 57.8 |  | 22.1 |  |
| ③ | UPPER | 10 | 28.0 | 20.1 | 27.5 | 12.8 |
|   | LOWER | 10 | 71.4 |  | 23.9 |  |
| ④ | UPPER | 9 | 21.1 | 16.8 | 25.7 | 12.9 |
|   | LOWER | 11 | 81.8 |  | 25.7 |  |
| ⑤ | UPPER | 8 | 16.7 | 14.3 | 22.8 | 12.6 |
|   | LOWER | 12 | 97.3 |  | 28 |  |

DC COMMUTATOR MOTOR AND AUTOMOBILE INCLUDING THE SAME

BACKGROUND OF THE INVENTION

1. Field of the Invention

The present invention relates to a DC commutator motor and an automobile including the same, and particularly, to a DC commutator motor including an upper coil and a lower coil connected in parallel as an armature winding, and an automobile including the same.

2. Description of the Related Art

DC commutator motors, with which high power can be obtained with ease, have been used as, for example, motors for driving hydraulic pumps for vehicles. In recent years, DC commutator motors have also started being used for auxiliary machines of an automobile besides hydraulic pumps in order to reduce fuel consumption of the automobile. The number of DC commutator motors mounted on an automobile is on the increase under such circumstances. To cope with this trend, a reduction in size and weight of a motor should be promoted while its output is maintained. Consequently, an output power volume ratio (a value obtained by dividing the output of a motor by the volume of the motor) demanded of a DC commutator motor to be mounted on an automobile is ever increasing.

There is a DC commutator motor known for each coil constituted by one winding conductor wound in a wave winding (see, for example, JP-2007-151268-A).

Here, the maximum applied voltage of the DC commutator motor is the guaranteed voltage of a battery to be mounted on an automobile, and hence, the output power volume ratio is increased by increasing a current flowing through the DC commutator motor (use of high current). The use of the high current, however, leads to an elevated temperature of the DC commutator motor. Thus, an adequate diameter is selected for the winding conductor to keep the temperature elevation in an allowable range. Particularly, in order to cope with the use of the high current, the winding conductor is designed to have a diameter increased accordingly. Here, winding tension is increased so that the winding conductor fits securely in the inside of a slot provided in an armature.

SUMMARY OF THE INVENTION

In the case with the DC commutator motor disclosed in JP-2007-151268-A, if its diameter is increased excessively to cope with the use of the high current, it takes an effort to route the winding conductor, posing a difficulty in winding the winding conductor. There is also a limit to the increase in the tension set for the winding. Furthermore, complexity of connecting the winding conductor and a terminal is increased, resulting in increased assembly man-hours, which is a factor to increase costs. In addition, a portion of the winding conductor disposed between one slot and a subsequent slot when the winding conductor is wound is referred to as a crossover line. Crossover lines overlap with each other at ends of coils, and the ends of the coils become larger as the diameter of the winding conductor is increased, resulting in an increased size of the motor.

To cope with this, at least two thin winding conductors are used in parallel, so that the winding performance of the winding conductor is improved while the area of the cross section of the winding conductor is increased. This, however, has posed a concern about a short circuit between the winding conductors, which are twisted. As a solution to this, a varnish treatment is provided for the purpose of fixing the coils and maintaining insulation performance. This, however, has increased man-hours for the motor assembly, resulting in a cost increase.

Furthermore, ununiform resistance values of parallel armature coils cause a selective action, which leads to an excessive increase in temperature of the motor, resulting in a reduction in an output power volume ratio and efficiency of the motor.

In addition, the DC commutator motor, disclosed in JP-2007-151268-A, has presented a problem that the stabilization of commutation and the reduction of sparking voltage at the completion of the commutation may not be achieved. For stabilizing the commutation and reducing the sparking voltage at the completion of the commutation, a reduction in a combined inductance is an important subject to be considered.

It is therefore an object of the present invention to provide a DC commutator motor that has a good commutating ability and can suppress a reduction in an output power volume ratio and to provide an automobile provided with the DC commutator motor.

In order to attain the object described above, the present invention provides a DC commutator motor that includes: a yoke; a field magnet positioned at an inner peripheral side of the yoke; an armature rotatably supported at an inner peripheral side of the field magnet with a gap therebetween; a shaft positioned on a central axis of the armature; a plurality of commutator segments positioned in a circumferential direction of the shaft; a plurality of armature slots positioned on an outer periphery of the armature; an upper coil wound the number of turns Na through two of the armature slots at an opening side of each of the two slots, the two of the armature slots being located apart from each other with the predetermined number of armature slots therebetween; and a lower coil connected in parallel with the upper coil, the lower coil being wound the number of turns Nb through the two of the armature slots at a bottom side of each of the two slots, wherein the number of turns Na is smaller than the number of turns Nb.

This reduces the combined inductance of the upper coil and the lower coil. The reduction in combined inductance reduces the voltage (sparking voltage) applied to the commutator segments, improving the commutating ability of the DC commutator motor.

According to the present invention, a good commutating ability can be obtained and a reduction in an output power volume ratio can be suppressed.

DESCRIPTION OF THE PREFERRED EMBODIMENTS

Some embodiments of the present invention will be described with reference to FIGS. 1 to 10. A DC commutator motor of the wave winding with 6 poles and 17 slots will be described below as an example. This DC commutator motor is used, for example, for a hydraulic pump in an automobile.

Figure 1:
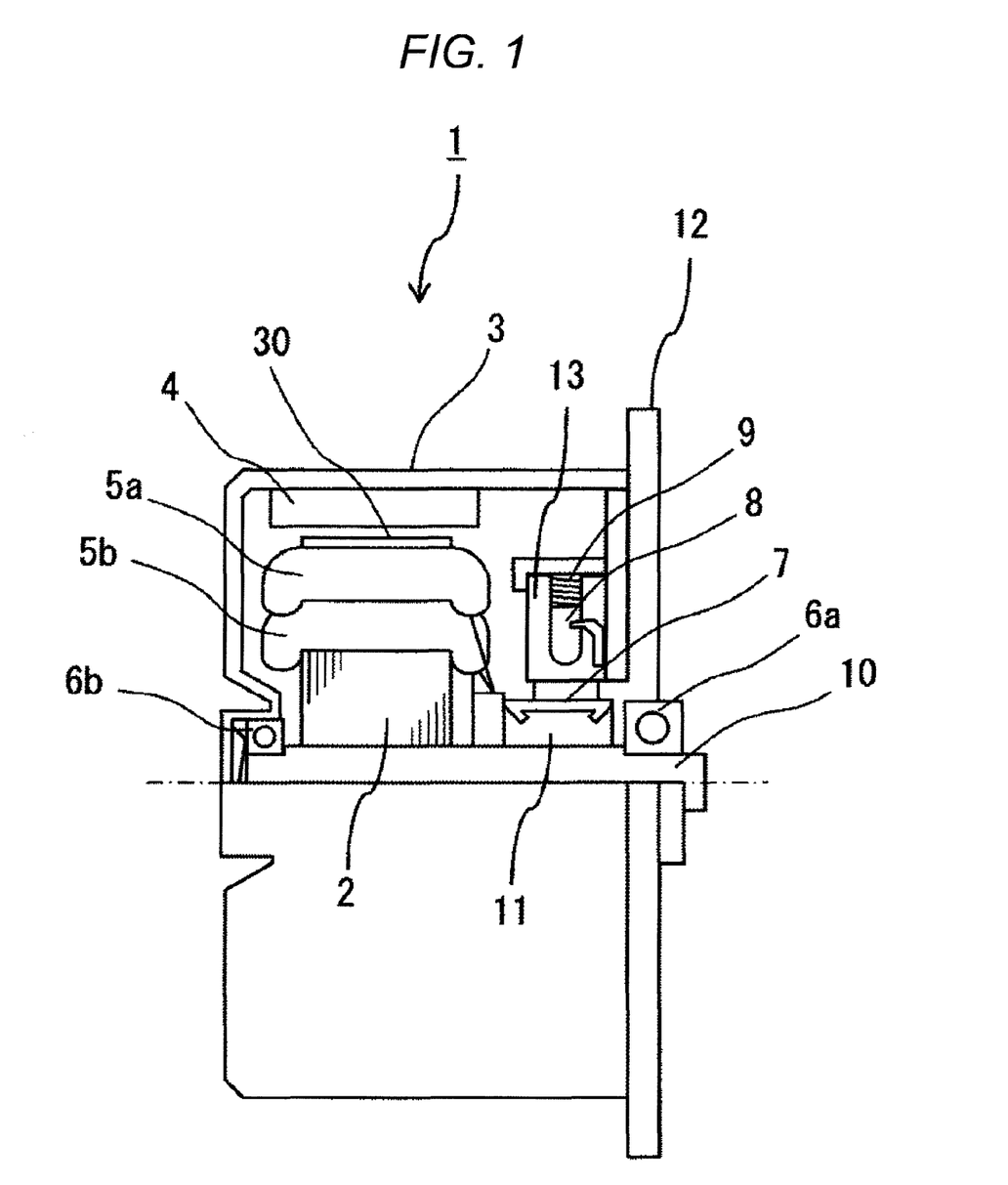
FIG. 1 is a cross-sectional view of a DC commutator motor, observed from a side thereof, according to an embodiment of the present invention.

A configuration of a DC commutator motor will now be described with reference to FIGS. 1 and 2. FIG. 1 is a cross-sectional view of the DC commutator motor, observed from a side thereof, according to an embodiment of the present invention.

A DC commutator motor 1 includes a yoke 3, a front bracket 12, a field magnet 4, and an armature 30 (a rotor).

The yoke 3 is substantially cylindrical and includes an output-shaft-opposite-side bearing 6b. As illustrated in FIG. 1, the output-shaft-opposite-side bearing 6b is positioned at a middle of an end face of the yoke 3 and rotatably supports one end of a shaft 10.

The front bracket 12 is substantially disk-shaped and includes a brush holder 13 and an output-shaft-side bearing 6a. The front bracket 12 is positioned at an end of the yoke 3. The brush holder 13 retains a brush 8. A brush spring 9 is positioned between the brush holder 13 and the brush 8. The brush 8 is urged toward a commutator segment 7 by an elastic force of the brush spring 9 (an elastic body) to slide in contact with the commutator segment 7. This allows the brush 8 to supply electric power, supplied from the outside, through the commutator segment 7 to an upper coil 5a and a lower coil 5b to be described hereinafter. The output-shaft-side bearing 6a is positioned at a center of the front bracket 12 and rotatably supports another end of the shaft 10.

The field magnet 4 (a stator) is positioned on an inner peripheral surface of the yoke 3 and generates a magnetic field.

The armature 30 is substantially cylindrical and includes an armature core 2, the upper coil 5a, the lower coil 5b, the commutator segment 7, and the shaft 10. The armature core 2 is formed by laminating substantially disk-shaped thin steel plates. The shaft 10 is positioned on a central axis of the armature 30 and is rotatably supported by the output-shaft-side bearing 6a and the output-shaft-opposite-side bearing 6b. Here, the external diameter of the armature 30 is smaller than the inner diameter of the field magnet. This allows the armature 30 to be rotatably supported at an inner peripheral side of the field magnet 4 with a gap therebetween.

The commutator segment 7 is positioned at a portion of the shaft 10 and supplies the electric power, supplied from the outside, to the upper coil 5a and the lower coil 5b. A configuration of the commutator segment 7 will be described in detail hereinafter with reference to FIGS. 3 and 4. Here, the commutator segment 7 and the shaft 10 are fixed with each other by using a phenolic resin 11. The upper coil 5a is positioned at an outer peripheral side of the armature core 2 (at an upper side of FIG. 1). The lower coil 5b is positioned at an inner peripheral side of the armature core 2 (at a lower side of FIG. 1).

Figure 2:
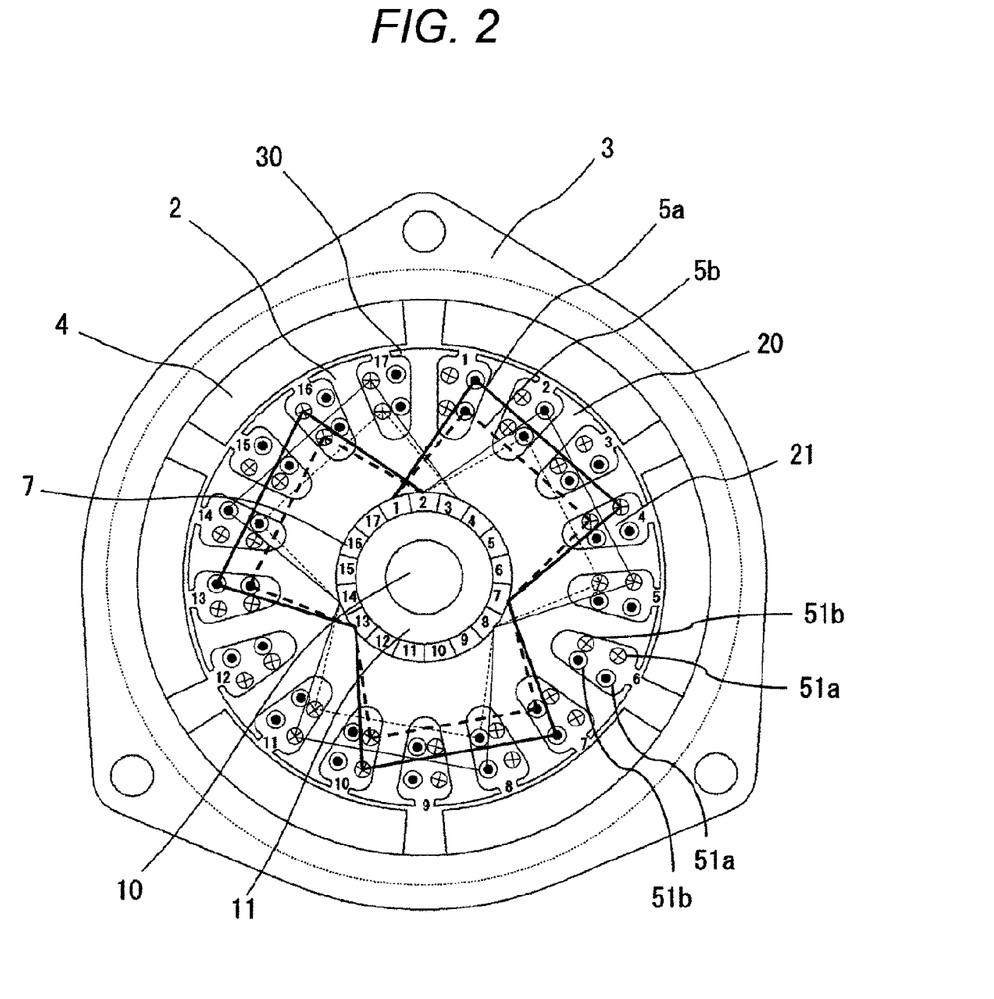
FIG. 2 is a cross-sectional view of the DC commutator motor, illustrated in FIG. 1, observed from an axial direction.

FIG. 2 is a cross-sectional view of the DC commutator motor, illustrated in FIG. 1, observed from the axial direction. Note that like reference characters indicate similar parts in FIG. 1. In FIG. 2, the upper coils 5a are illustrated with solid lines, and the lower coils 5b with broken lines. Note that not all the coils are illustrated with the solid lines or the broken lines to facilitate viewing.

Armature teeth 20 are formed (positioned) at equal intervals on an outer periphery of the armature core 2. An armature slot 21 is formed between two neighboring armature teeth 20. In other words, the armature slots 21 are formed (positioned) at equal intervals on the outer periphery of the armature core 2. In the present embodiment, the armature core 2 has 17 armature teeth 20 and 17 armature slots 21.

Six field magnets 4 (stators) are positioned at equal intervals in a circumferential direction of the inner peripheral surface of the yoke 3.

The upper coil 5a is positioned at an opening side (an upper layer side) of the armature slot 21. The lower coil 5b is positioned at a bottom side (a lower layer side) of the armature slot 21. Two coil segments 51a of the upper coils 5a and two coil segments 51b of the lower coils 5b are present in one armature slot 21.

Seventeen commutator segments 7 are positioned at equal intervals in a circumferential direction of the shaft 10.

Figure 3:
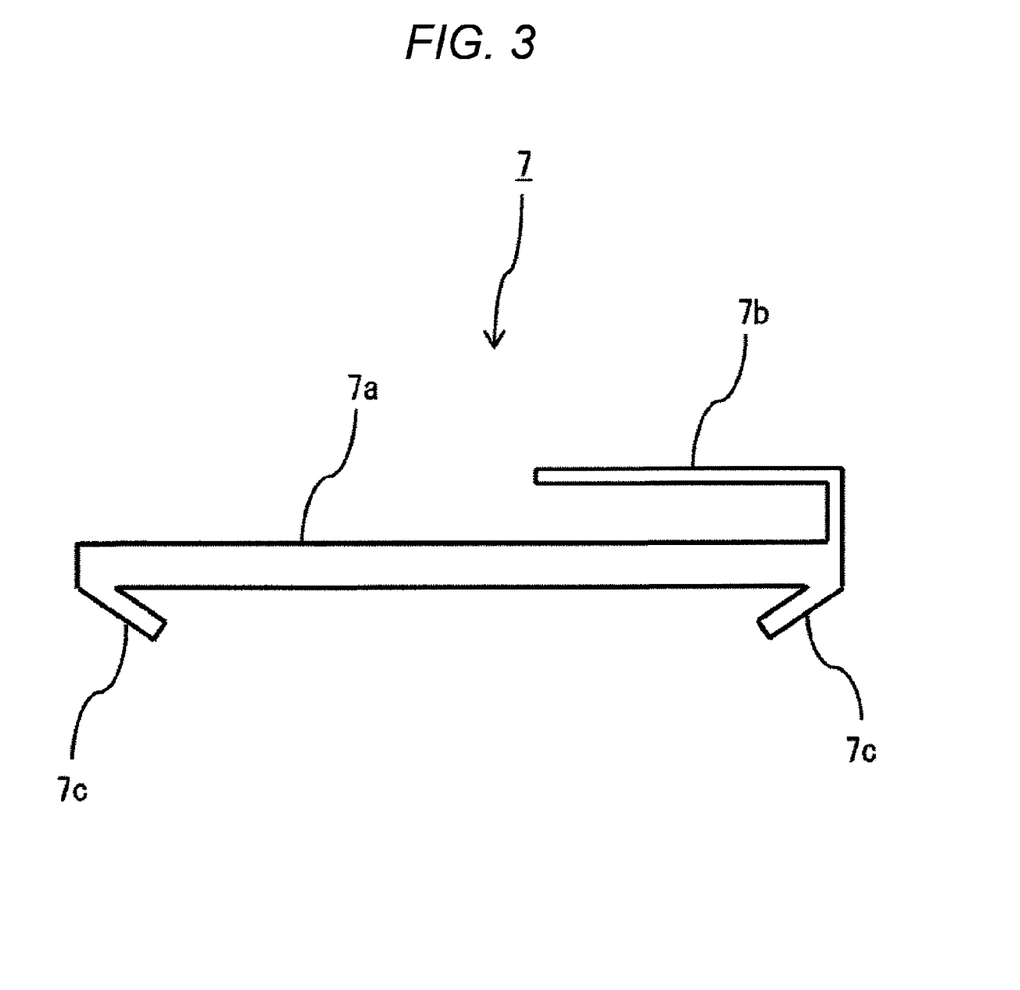
FIG. 3 is a cross-sectional view of a commutator segment for use in the DC commutator motor according to the embodiment of the present invention.
Figure 4:
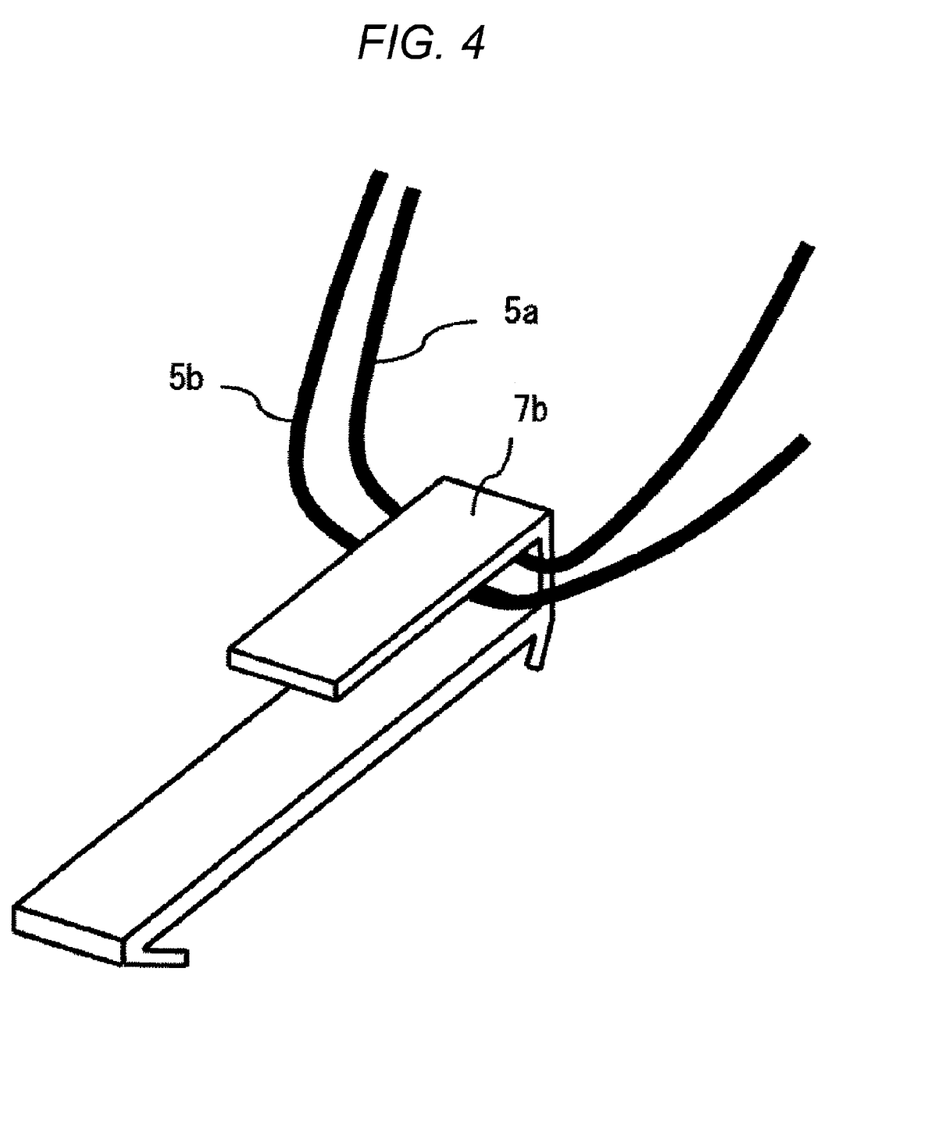
FIG. 4 is a diagram for describing a use condition of the commutator segment for use in the DC commutator motor according to the embodiment of the present invention.

A configuration of the commutator segment 7 will now be described in detail with reference to FIGS. 3 and 4. FIG. 3 is a cross-sectional view of the commutator segment 7. FIG. 4 is a diagram for describing a use condition of the commutator segment 7.

The commutator segment 7 is made of metal (a conductive member) and includes a sliding contact portion 7a, a hook portion 7b in a hook shape, and an anchor portion 7c as illustrated in FIG. 3. The sliding contact portion 7a slides in contact with the brush 8. The anchor portion 7c functions as an anchor to the phenolic resin 11 to fix the commutator segment 7. The hook portion 7b can hook winding conductors of the upper coil 5a and the lower coil 5b as illustrated in FIG. 4. The winding conductors are hooked as described above and then welded so that the winding conductors of the upper coil 5a and the lower coil 5b are fixed to the hook portion 7b of the commutator segment 7.

A process for winding the upper coils 5a and the lower coils 5b will now be described with reference to FIG. 2. The process for winding the upper coils 5a and the lower coils 5b can be divided into a first winding process and a second winding process. The first winding process is for winding all the lower coils 5b sequentially. The second winding process is for winding all the upper coils 5a sequentially. Here, the second winding process is performed after the first winding process is finished, because the upper coil 5a is positioned at the opening side of the armature slot 21 and the lower coil 5b is positioned at the bottom side of the armature slot 21.

(First Winding Process)

An end of one continuous winding conductor (represented by a thick broken line in FIG. 2) is hooked to the hook portion 7b of a first commutator segment 7. Another end of the winding conductor is inserted into a first armature slot 21 at its bottom side. The winding conductor is then wound through the first armature slot 21 and a fourth armature slot 21 at its bottom side the number of turns Nb. The fourth armature slot 21 is located apart from the first armature slot 21 with two armature slots 21 therebetween. The winding conductor is then hooked to the hook portion 7b of a seventh commutator segment 7. A first lower coil 5b is wound as described above.

The winding conductor is then inserted into a seventh armature slot 21 at its bottom side. The winding conductor is then wound through the seventh armature slot 21 and a 10th armature slot 21 at its bottom side the number of turns Nb. The 10th armature slot 21 is located apart from the seventh armature slot 21 with two armature slots 21 therebetween. The winding conductor is then hooked to the hook portion 7b of a 13th commutator segment 7. A second lower coil 5b is wound as described above.

The winding conductor is further inserted into a 13th armature slot 21 at its bottom side. The winding conductor is then wound through the 13th armature slot 21 and a 16th armature slot 21 at its bottom side the number of turns Nb. The 16th armature slot 21 is located apart from the 13th armature slot 21 with two armature slots 21 therebetween. The winding conductor is then hooked to the hook portion 7b of a second commutator segment 7. A third lower coil 5b is wound as described above.

The winding conductor (represented by a thin broken line in FIG. 2) is then inserted into a second armature slot 21 at its bottom side. The winding conductor is wound through the second armature slot 21 and a fifth armature slot 21 at its bottom side the number of turns Nb. The fifth armature slot 21 is located apart from the second armature slot 21 with two armature slots 21 therebetween. The winding conductor is then hooked to the hook portion 7b of an eighth commutator segment 7. A fourth lower coil 5b is wound as described above.

The winding conductor is then inserted into an eighth armature slot 21 at its bottom side. The winding conductor is wound through the eighth armature slot 21 and an 11th armature slot 21 at its bottom side the number of turns Nb. The 11th armature slot 21 is located apart from the eighth armature slot 21 with two armature slots 21 therebetween. The winding conductor is then hooked to the hook portion 7b of a 14th commutator segment 7. A fifth lower coil 5b is wound as described above.

The winding conductor is further inserted into a 14th armature slot 21 at its bottom side. The winding conductor is wound through the 14th armature slot 21 and a 17th armature slot 21 at its bottom side the number of turns Nb. The 17th armature slot 21 is located apart from the 14th armature slot 21 with two armature slots 21 therebetween. The winding conductor is then hooked to the hook portion 7b of a third commutator segment 7. A sixth lower coil 5b is wound as described above.

The lower coils 5b will be further wound in a similar manner. In the first winding process, the winding conductor passes through the commutator segments with the ordinal numbers of 1, 7, 13, 2, 8, 14, 3, 9, 15, 4, 10, 16, 5, 11, 17, 6, 12, and 1 in the sequence set forth. Hence, an end point of the winding of all the lower coils 5b is hooked to the hook portion 7b of the first commutator segment 7.

(Second Winding Process)

The end point of the winding of all the lower coils 5b will be a start point of the winding of the upper coils 5a. The winding conductor (represented by a thick solid line in FIG. 2), which has been finally hooked to the hook portion 7b of the first commutator segment 7 in the first winding process, is inserted into the first armature slot 21 at its opening side. The winding conductor is then wound through the first armature slot 21 and the fourth armature slot 21 at its opening side the number of turns Na (where Na<Nb). The fourth armature slot 21 is located apart from the first armature slot 21 with two armature slots 21 therebetween. The winding conductor is then hooked to the hook portion 7b of the seventh commutator segment 7. A first upper coil 5a is wound as described above.

The winding conductor is then inserted into the seventh armature slot 21 at its opening side. The winding conductor is wound through the seventh armature slot 21 and the 10th armature slot 21 at its opening side the number of turns Na. The 10th armature slot 21 is located apart from the seventh armature slot 21 with two armature slots 21 therebetween. The winding conductor is then hooked to the hook portion 7b of the 13th commutator segment 7. A second upper coil 5a is wound as described above.

The winding conductor is further inserted into the 13th armature slot 21 at its opening side. The winding conductor is wound through the 13th armature slot 21 and the 16th armature slot 21 at its opening side the number of turns Na. The 16th armature slot 21 is located apart from the 13th armature slot 21 with two armature slots 21 therebetween. The winding conductor is then hooked to the hook portion 7b of the second commutator segment 7. A third upper coil 5a is wound as described above.

The upper coils 5a will be further wound in a similar manner. In the second winding process, the winding conductor passes through the commutator segments with the ordinal numbers of 1, 7, 13, 2, 8, 14, 3, 9, 15, 4, 10, 16, 5, 11, 17, 6, 12, and 1 in the sequence set forth. Hence, an end point of the winding of all the upper coils 5a is hooked to the hook portion 7b of the first commutator segment 7.

When the first and second winding processes have been performed, the winding conductor of the upper coils 5a and the lower coils 5b, which has been hooked to the hook portions 7b of the commutator segments 7, is then welded to be fixed to the hook portions 7b of the commutator segments 7. This securely connects all the upper coils 5a and all the lower coils 5b to the commutator segments 7. In addition, an increased winding tension can be set because the winding conductor is hooked to the hook portions 7b during the winding.

In the present embodiment, one continuous winding conductor constitutes all the upper coils 5a and all the lower coils 5b. In other words, all the upper coils 5a and all the lower coils 5b are wound in a manner as if a line is continuously extended from one end to another end. This allows all the upper coils 5a and all the lower coils 5b to be wound in one operation with ease. Note that, in the present embodiment, the winding conductor of the upper coils 5a has an identical wire diameter to the winding conductor of the lower coils 5b.

Figure 5:
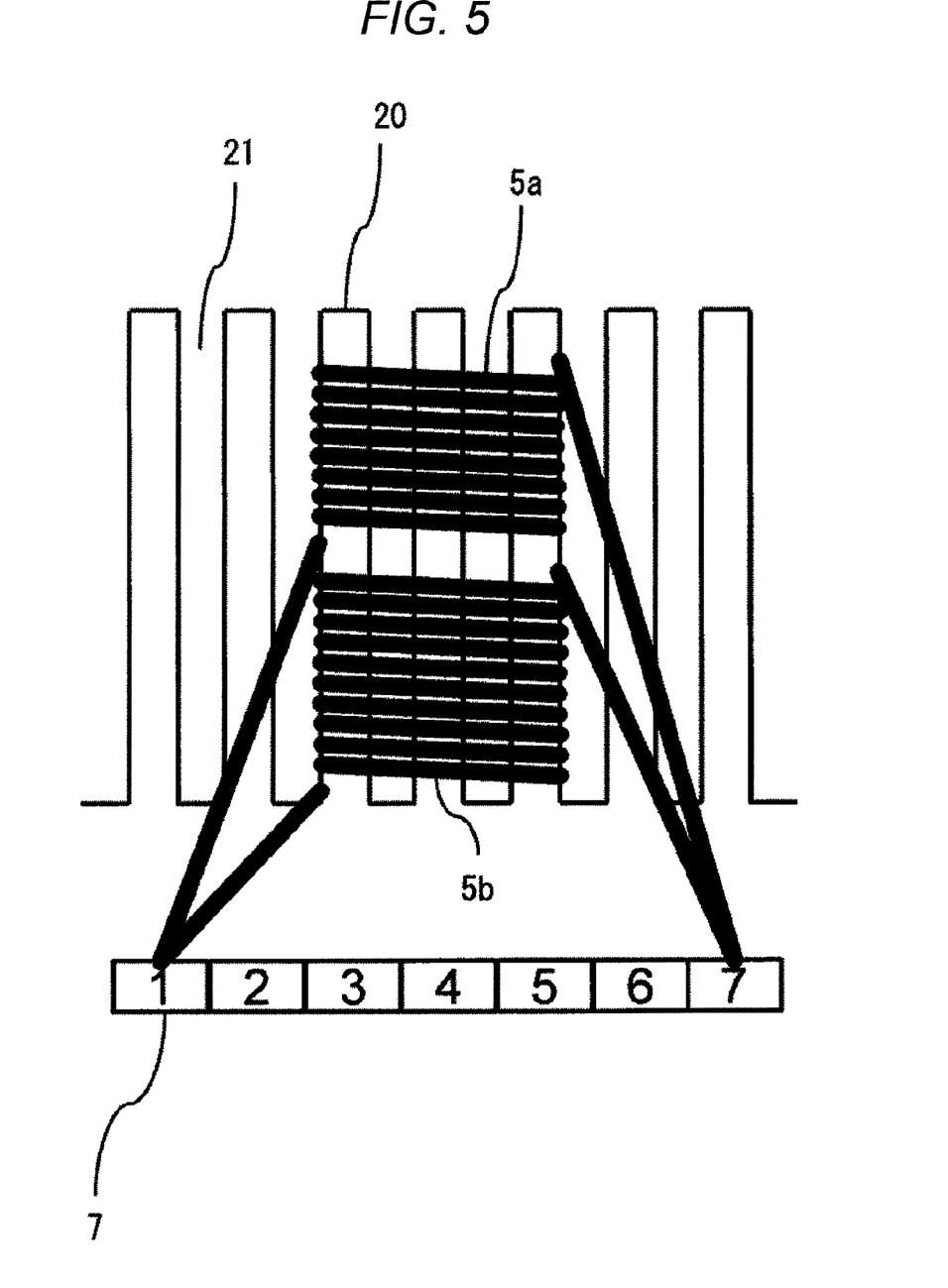
FIG. 5 is a schematic view of an upper coil and a lower coil, observed from the axial direction of an armature, for use in the DC commutator motor according to the embodiment of the present invention.

FIG. 5 is a schematic view of the upper coil 5a and the lower coil 5b observed from the axial direction of the armature 30. For simplicity of the description, seven armature teeth 20, six armature slots 21, and seven commutator segments 7 are illustrated in FIG. 5. In this example, an upper coil 5a with the number of turns Na=9 and a lower coil 5*b* with the number of turns Nb=11 are connected in parallel to the first commutator segment 7 and the seventh commutator segment 7.

A winding arrangement of the DC commutator motor 1 configured as described above will now be described with reference to FIGS. 2 and 6. As illustrated in FIG. 2, two coil segments 51*a* of the upper coils 5*a* and two coil segments 51*b* of the upper coils 5*b* are present in one armature slot 21. In total, 4 coil segments 51 are present in one armature slot 21. Hence, 68 coil segments 51 (4 coil segments×17 slots) are present in the entire armature 30.

Figure 6:
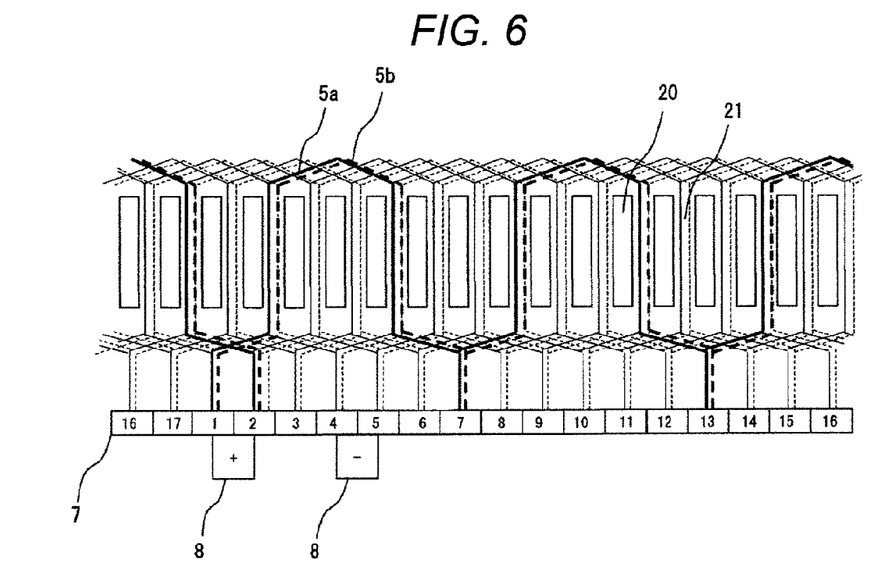
FIG. 6 is a winding connection diagram for describing a winding arrangement of the DC commutator motor illustrated in FIG. 2.

FIG. 6 is a winding connection diagram for describing a winding arrangement of the DC commutator motor 1 illustrated in FIG. 2. In FIG. 6, the upper coils 5*a* are represented by solid lines, and the lower coils 5*b* are represented by broken lines. Note that, in FIG. 6, 17 armature teeth 20, 17 armature slots 21, 17 commutator segments 7, and two brushes 8 (an anode and a cathode) are illustrated. The winding conductors of two upper coils 5*a* and the winding conductors of two lower coils 5*b* are connected to one commutator segment 7. Thus, in total, four winding conductors are connected to one commutator segment 7.

An operation of the DC commutator motor according to the embodiment of the present invention will now be described with reference to FIG. 2. When voltage is applied to the brushes 8 (not illustrated in FIG. 2), current passes through the commutator segments 7 that slide in contact with the brushes 8. The current then passes through the upper coils 5*a* and the lower coils 5*b* connected to the commutator segments 7. This allows the magnetic field generated by the field magnets 4 and a magnetic field generated by the upper coils 5*a* and the lower coils 5*b* to interact with each other to generate a continuous rotational torque, resulting in a mechanical output.

Figure 7:
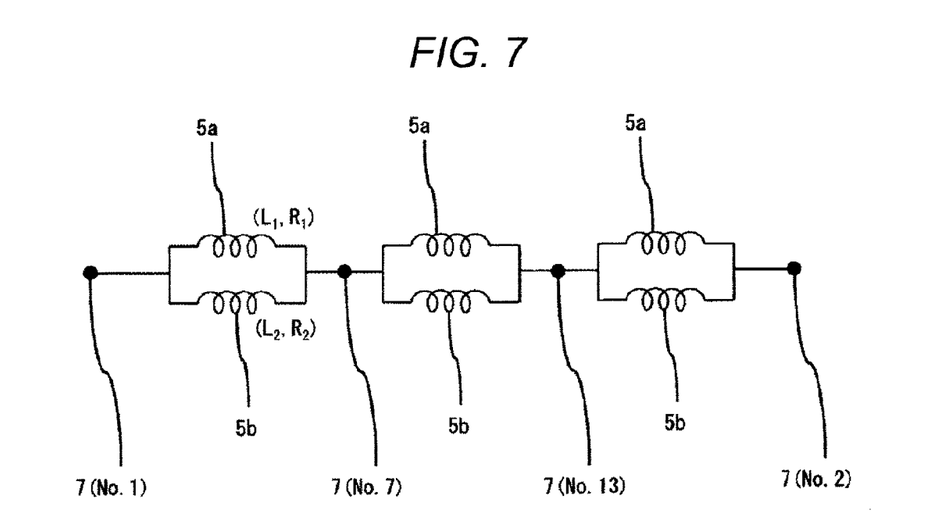
FIG. 7 is a circuit diagram of a circuit including first to third upper coils and lower coils for use in the DC commutator motor according to the embodiment of the present invention.

An operational advantage of the DC commutator motor 1 according to the embodiment of the present invention will now be described with reference to FIGS. 7 to 10. FIG. 7 is a circuit diagram of a circuit including the first to third upper coils 5*a* and lower coils 5*b*. Note that, in FIG. 7, an i-th commutator segment 7 is represented by reference characters 7 (No. i). This circuit includes three upper coils 5*a* and three lower coils 5*b*. That is, this circuit includes six coils in total. The first upper coil 5*a* and the first lower coil 5*b* are electrically connected in parallel to the first commutator segment 7 and the seventh commutator segment 7. The second upper coil 5*a* and the second lower coil 5*b* are electrically connected in parallel to the seventh commutator segment 7 and the 13th commutator segment 7. The third upper coil 5*a* and the third lower coil 5*b* are electrically connected in parallel to the 13th commutator segment 7 and the second commutator segment 7.

For simplicity of the description, the first upper coil 5*a* and the first lower coil 5*b*, connected in parallel, will be described. Here, inductance values of the upper coil 5*a* and the lower coil 5*b* are represented by L1 and L2, respectively. Resistance values of the upper coil 5*a* and the lower coil 5*b* are represented by R1 and R2, respectively. A combined inductance value and a combined resistance value of the upper coil 5*a* and the lower coil 5*b* are represented by Lp and Rp, respectively.

Ease with which magnetic flux can pass varies in a manner dependent on the positions of the coils arranged in relation to the armature slot 21, a material of the armature core 2, the shape of the armature slots 21, and the like. In the present embodiment, the upper coil 5*a* is positioned at the opening side of the armature slot 21, and the lower coil 5*b* is positioned at the bottom side of the armature slot 21. Hence, the ease with which the magnetic flux can pass through the lower coil 5*b* is greater than the ease with which the magnetic flux can pass through the upper coil 5*a* with respect to the armature core 2. Thus, if the number of turns Na of the upper coil 5*a* is identical to the number of turns Nb of the lower coil 5*b*, the inductance value L2 of the lower coil 5*b* is greater than the inductance value L1 of the upper coil 5*a*.

The resistance values of the coils are determined by their circumferences, if the winding conductors have an identical wire diameter. In other words, the resistance values of the coils are determined by the lengths of the winding conductors that constitute the coils, if the winding conductors have an identical wire diameter. In the present embodiment, the upper coil 5*a* is located on the outer peripheral side of the armature 30 in comparison with the lower coil 5*b*. Thus, the crossover line of the upper coil 5*a* has a length longer than that of the crossover line of the lower coil 5*b*. If, therefore, the number of turns Na of the upper coil 5*a* is identical to the number of turns Nb of the lower coil 5*b*, a resistance value R1 of the upper coil 5*a* is higher than a resistance value R2 of the lower coil 5*b*.

The resistance value of the upper coil 5*a* increases with respect to the resistance value of the lower coil 5*b* at a ratio dependent on a ratio between the external diameter of the armature 30 and the axial dimension of the armature 30.

If the external diameter of the armature 30 is larger than the axial dimension of the armature 30, or in other words, if the armature 30 has a low profile, the resistance value of the upper coil 5*a* increases at a high ratio with respect to the resistance value of the lower coil 5*b*. This is because, in the case of a low-profile armature 30, the crossover lines of the winding conductor bring about a significant effect on the resistance values of the coils.

Conversely, if the external diameter of the armature 30 is smaller than the axial dimension of the armature 30, or in other words, if the armature 30 has a high profile, the resistance value of the upper coil 5*a* increases at a low ratio with respect to the resistance value of the lower coil 5*b*. This is because the crossover lines of the winding conductor bring about a less significant effect on the resistance values of the coils, contrarily to the case of the armature 30 with a low profile.

The resistance values and the inductance values of the upper coil 5*a* and the lower coil 5*b* will now be described with reference to FIGS. 8 to 10.

Figure 8:
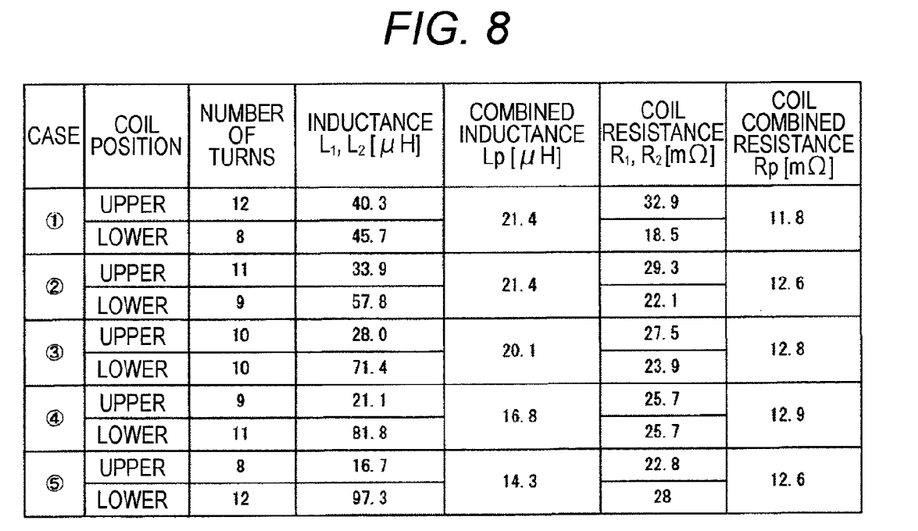
FIG. 8 is a table of inductance values L1 and L2, a combined inductance value Lp, resistance values R1 and R2, and a combined resistance value Rp, when the number of turns of the upper coil and the number of turns of the lower coil are varied under a condition that the sum of the numbers of turns of the upper coil and the lower coil is maintained at 20.

FIG. 8 is a table of the inductance values L1 and L2, the combined inductance value Lp, the resistance values R1 and R2, and the combined resistance value Rp, when the number of turns Na of the upper coil 5*a* and the number of turns Nb of the lower coil 5*b* are varied under a condition that the sum of the numbers of turns of the upper coil and the lower coil is maintained at 20 (constant). Five cases have been studied with the following conditions of the number of turns of the upper coil 5*a* and the number of turns of the lower coil 5*b*: (12 turns/8 turns), (11 turns/9 turns), (10 turns/10 turns), (9 turns/11 turns), and (8 turns/12 turns), as (the number of turns of the upper coil 5*a*/the number of turns of the lower coil 5*b*).

Figure 9:
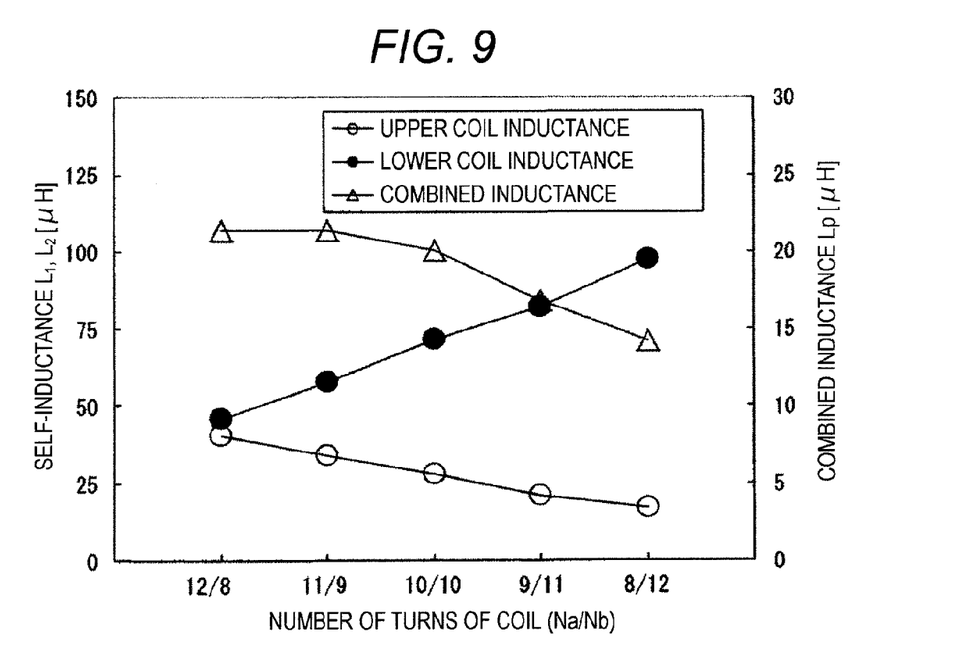
FIG. 9 is a graph of the inductance values L1 and L2 and the combined inductance value Lp illustrated in FIG. 8.

FIG. 9 is a graph of the inductance values L1 and L2 and the combined inductance value Lp illustrated in FIG. 8. FIG. 10 is a graph of the resistance values R1 and R2 and the combined resistance value Rp illustrated in FIG. 8. As illustrated in FIG. 9, under the condition that the sum of the number of turns Na of the upper coil 5*a* and the number of turns Nb of the lower coil 5*b* is 20, the combined inductance value of the upper coil 5*a* and the lower coil 5*b* decreases as the number of turns Nb of the lower coil 5b increases. Note that the inductance value L1 of the upper coil 5a decreases as the number of turns Na of the upper coil 5a decreases. The inductance value L2 of the lower coil 5b increases as the number of turns Nb of the lower coil 5b increases.

Figure 10:
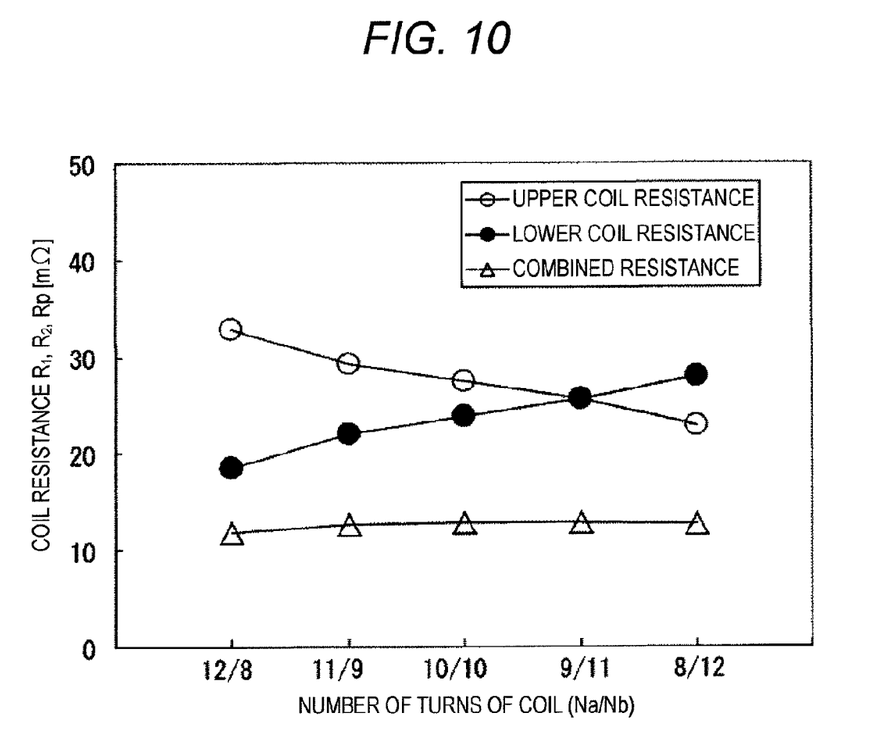
FIG. 10 is a graph of the resistance values R1 and R2 and the combined resistance value Rp illustrated in FIG. 8.

As illustrated in FIG. 10, under the condition that the sum of the number of turns Na of the upper coil 5a and the number of turns Nb of the lower coil 5b is 20, the resistance value R1 of the upper coil 5a is identical to the resistance value R2 of the lower coil 5b, when the number of turns Na of the upper coil 5a is 9 and the number of turns Nb of the lower coil 5b is 11. Note that the resistance value R1 of the upper coil 5a decreases as the number of turns Na of the upper coil 5a decreases. The resistance value R2 of the lower coil 5b increases as the number of turns Nb of the lower coil 5b increases.

In the present embodiment, the resistance value R1 of the upper coil 5a is identical to the resistance value R2 of the lower coil 5b when the number of turns Na of the upper coil 5a is 9 and the number of turns Nb of the lower coil 5b is 11. The numbers of turns at which the resistance value R1 of the upper coil 5a is identical to the resistance value R2 of the lower coil 5b, however, vary in a manner dependent on the shape of the armature 30. As described above, the resistance values of the coils are determined by the lengths of the winding conductors that constitute the coils, if the winding conductors have an identical wire diameter. Hence, when the number of turns Na of the upper coil 5a and the number of turns Nb of the lower coil 5b are set such that the winding conductor constituting the upper coil 5a and the winding conductor constituting the lower coil 5b have an identical length, the resistance value R1 of the upper coil 5a is identical to the resistance value R2 of the lower coil 5b.

In, some cases dependent on the shape of the armature 30, however, the resistance value R1 of the upper coil 5a may not be identical to the resistance value R2 of the lower coil 5b even if the number of turns Na of the upper coil 5a and the number of turns Nb of the lower coil 5b are adjusted. In this case, the number of turns Na of the upper coil 5a and the number of turns Nb of the lower coil 5b may be set such that the difference between the resistance value R1 of the upper coil 5a and the resistance value R2 of the lower coil 5b is a minimum. Specifically, as described above, the resistance values of the coils are determined by the lengths of the winding conductors that constitute the coils, if the winding conductors have an identical wire diameter. Hence, when the number of turns Na of the upper coil 5a and the number of turns Nb of the lower coil 5b are set such that the difference between the length of the winding conductor constituting the upper coil 5a and the length of the winding conductor constituting the lower coil 5b is a minimum, the difference between the resistance value R1 of the upper coil 5a and the resistance value R2 of the lower coil 5b is a minimum.

With the DC commutator motor 1 according to the present embodiment, the condition of 9 turns for the upper coil 5a and 11 turns for the lower coil 5b is effective for both the reduction of the combined inductance and the equalization of the resistances. This allows simultaneously the commutating ability to be improved and currents passing through parallel windings to be equalized, reducing the current value bias and Joule heating, thereby suppressing an increase in temperature of the motor.

In other words, the reduction in the combined inductance reduces voltage (sparking voltage) applied to the commutator segment 7, resulting in an improved commutating ability of the DC commutator motor 1. Furthermore, by suppressing the increase in temperature of the motor, the reduction in the output power volume ratio of the DC commutator motor 1 can be suppressed. Thus, the DC commutator motor 1 can provide a good commutating ability and suppress the reduction in the output power volume ratio.

In order to place a priority on the improvement of the commutation ability, the number of turns of the upper coil 5a may be reduced to provide a condition that enables a further reduction of the combined inductance, such as 8 turns of the upper coil 5a and 12 turns of the lower coil 5b, rather than the condition of 9 turns for the upper coil 5a and 11 turns for the lower coil 5b.

As described above, the combined inductance of the upper coil 5a and the lower coil 5b is reduced according to the present embodiment. This reduces voltage (sparking voltage) applied to the commutator segment 7, resulting in an improved commutating ability of the DC commutator motor 1. Furthermore, the resistance value of the upper coil and the resistance value of the lower coil are equalized, which eliminates the selective action, and, therefore, the increase in temperature of the motor can be suppressed. Hence, the reduction in the output power volume ratio of the DC commutator motor 1 can be suppressed. Thus, the DC commutator motor 1 can provide a good commutating ability and suppress the reduction in the output power volume ratio. In addition, one winding conductor is wound from the start point of winding to the end point of the winding while the winding conductor is hooked to the hook portions 7b of the commutator segments 7, and, therefore, a plurality of upper coils and a plurality of lower coils can be securely connected to the commutator segments.

(Modified Embodiments)

In the embodiment described above, one winding conductor is wound from the start point of the winding to the end point of the winding while the winding conductor is hooked to the hook portions 7b of the commutator segments 7, and thus, the commutator segment 7 connecting the end point of the winding of the lower coils 5b coincides with the commutator segment 7 connecting the start point of the winding of the upper coils 5a. This coincidence, however, does not have to take place.

In the present modified embodiment, the upper coils 5a are constituted by a first continuous winding conductor, while the lower coils 5b are constituted by a second continuous winding conductor. Here, the first winding conductor and the second winding conductor are separate winding conductors. Note that the first winding conductor and the second winding conductor have an identical wire diameter.

If one winding conductor is wound in a manner as if a line is continuously extended from one end to another end, a commutator segment 7 is uniquely determined for connecting the end point of the winding of the lower coils 5b and for connecting the start point of the winding of the upper coils 5a. Conversely, if one each winding conductor is used for the upper coils 5a and the lower coils 5b, any position can be set as the start point of the winding of the upper coils 5a. By adjusting the position of the start point of the winding of the upper coils 5a, an overlap of the crossover lines of the upper coils 5a and the lower coils 5b can be reduced in size. In addition, the plurality of upper coils and the plurality of lower coils can be each wound with ease.

An automobile will now be described, in which the DC commutator motor 1 according to an embodiment of the present invention is mounted as a motor for driving a hydraulic pump of the automobile as an example.

Figure 11:
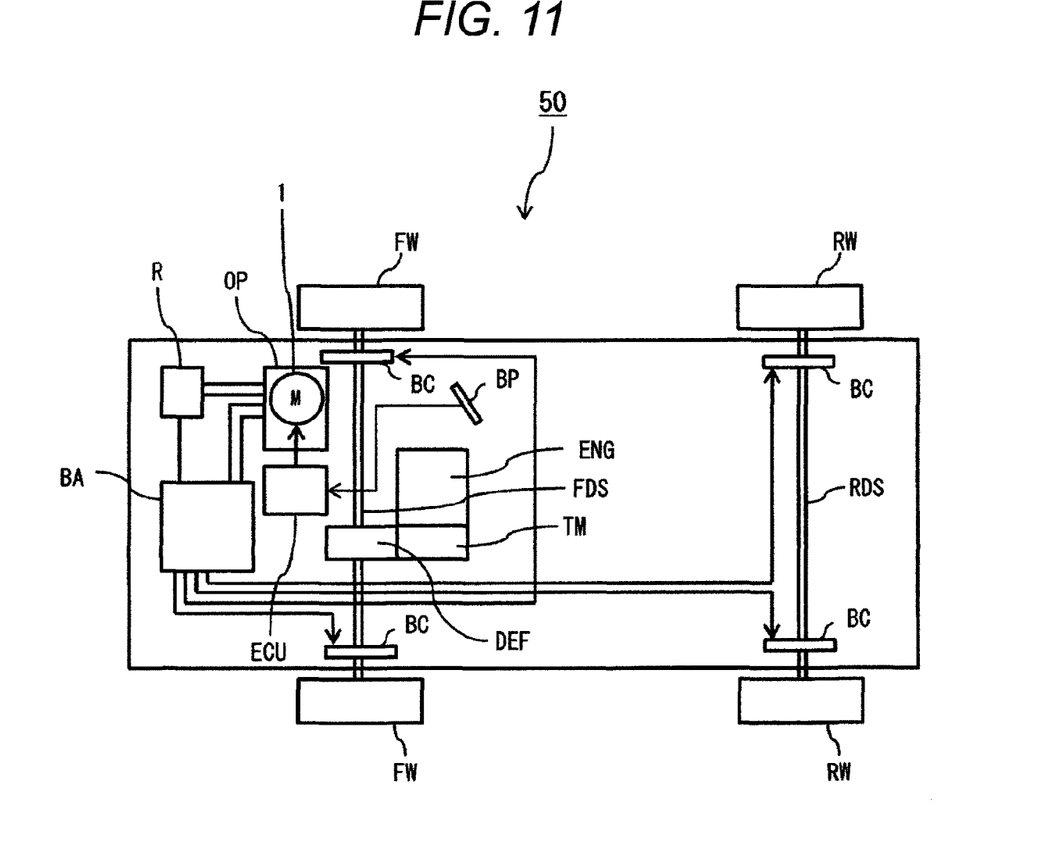
FIG. 11 is a schematic block diagram of an automobile provided with a DC commutator motor according to an embodiment of the present invention.

FIG. 11 is a schematic block diagram of the automobile provided with the DC commutator motor 1 according to the embodiment of the present invention.

An automobile 50 has a configuration that is roughly divided into a drive system and a brake system. The drive system includes an engine ENG, a transmission TM, a differential DEF, a front drive shaft FDS, a front wheel FW, a rear drive shaft RDS, and a rear wheel RW. The brake system includes a brake pedal BP, a hydraulic pump OP (an automobile auxiliary machine), a reservoir R, an electronic control unit ECU, a brake actuator BA, and a brake caliper BC. Here, an automobile auxiliary machine refers to a peripheral device for operating an engine.

A description will be provided mainly on a structure and an operational advantage of the hydraulic pump OP, which is a characteristic part. The hydraulic pump OP includes the DC commutator motor 1 as a motor for driving the hydraulic pump. When a driver of the automobile depresses the brake pedal, brake information indicative of a depression angle of the brake pedal BP is input from the brake pedal BP to the electronic control unit ECU. According to the brake information, the electronic control unit ECU controls an output of the DC commutator motor 1 mounted on the hydraulic pump OP. The hydraulic pump OP, which is driven by the DC commutator motor 1, applies pressure to a hydraulic fluid supplied from the reservoir R under the control of the electronic control unit ECU. The brake actuator BA transmits the pressure applied by the hydraulic pump OP to the four brake calipers BC. The brake calipers BC are actuated by the pressure to apply the brake.

The DC commutator motor 1 can be reduced in size while its output is maintained because the output power volume ratio of the DC commutator motor 1 is higher than that of a conventional DC commutator motor. This can contribute to a reduction in size of the automobile 50.

The present invention is not limited to the embodiments described above, and various modifications are included in the present invention. For example, the embodiments described above have been described in detail in order to facilitate understanding. The embodiments are not limited to those that include the entire configurations described above. It is possible to replace a part of a configuration of an embodiment with a configuration of another embodiment. It is also possible to add, to a configuration of an embodiment, a configuration of another embodiment. It is further possible to add another configuration to a part of a configuration of each embodiment, delete a part of a configuration of each embodiment, and replace a part of a configuration of each embodiment with another configuration. A part or all of the configurations, functions, processing units, and the like described above may be also achieved by hardware by designing an integrated circuit, for example.

In the embodiments described above, a 6-pole, 17-slot DC commutator motor with the wave winding has been described as an example. The number of field magnets 4 (the number of poles) and the number of armature slots 21 (the number of slots), however, may be any number. A winding scheme is not limited to the wave winding and any scheme may be used.

In the embodiments described above, the sum of the number of turns Na of the upper coil 5a and the number of turns Nb of the lower coil 5b is 20, but this sum may be any number.

In the embodiment described above, the DC commutator motor 1 is mounted on an automobile as a motor for driving a hydraulic pump, but the DC commutator motor 1 may be used for any application.

What is claimed is:

1. A DC commutator motor comprising:
 a yoke;
 a field magnet positioned at an inner peripheral side of the yoke;
 an armature rotatably supported at an inner peripheral side of the field magnet with a gap therebetween;
 a shaft positioned on a central axis of the armature;
 a plurality of commutator segments positioned in a circumferential direction of the shaft;
 a plurality of armature slots positioned on an outer periphery of the armature;
 an upper coil wound the number of turns Na through two of the armature slots at an opening side of each of the two slots, the two of the armature slots being located apart from each other with a predetermined number of armature slots therebetween; and
 a lower coil connected in parallel with the upper coil, the lower coil being wound the number of turns Nb through the two of the armature slots at a bottom side of each of the two slots,
 wherein the number of turns Na is smaller than the number of turns Nb, and the number of turns Na of the upper coil and the number of turns Nb of the lower coil are set such that a lower coil resistance value is higher than an upper coil resistance value,
 wherein
 an end point of winding of an i-th (where i=1 to N) upper coil is connected to a start point of the winding of an (i+1)th upper coil, and
 an end point of the winding of an i-th (where i=1 to N) lower coil is connected to a start point of the winding of an (i+1) lower coil, and
 wherein a lower coil wire diameter is identical to an upper coil wire diameter.

2. The DC commutator motor according to claim 1, wherein
 the upper coil is constituted by a first continuous winding conductor, and
 the lower coil is constituted by a second continuous winding conductor.

3. The DC commutator motor according to claim 2, wherein
 each of the plurality of commutator segments comprises a hook portion, the hook portion comprising a conductive member in a hook shape,
 the end point of the winding of the i-th upper coil is hooked to the hook portion of one of the commutator segments to become the start point of the winding of the (i+1)th upper coil, the one of the commutator segments connecting the i-th upper coil and the (i+1)th upper coil, and
 the end point of the winding of the i-th lower coil is hooked to the hook portion of one of the commutator segments to become the start point of the winding of the (i+1)th lower coil, the one of the commutator segments connecting the i-th lower coil and the (i+1)th lower coil.

4. The DC commutator motor according to claim 3, wherein
 the first winding conductor and the second winding conductor are constituted by one continuous winding conductor.

5. The DC commutator motor according to claim 4, wherein
 an external diameter of the armature is larger than an axial dimension of the armature.

6. A DC commutator motor comprising:
a yoke;
a field magnet positioned at an inner peripheral side of the yoke;
an armature rotatably supported at an inner peripheral side of the field magnet with a gap therebetween;
a shaft positioned on a central axis of the armature;
a plurality of commutator segments positioned in a circumferential direction of the shaft;
a plurality of armature slots positioned on an outer periphery of the armature;
an upper coil wound the number of turns Na through two of the armature slots at an opening side of each of the two slots, the two of the armature slots being located apart from each other with the a predetermined number of armature slots therebetween; and
a lower coil connected in parallel with the upper coil, the lower coil being wound the number of turns Nb through the two of the armature slots at a bottom side of each of the two slots,
wherein the number of turns Na is smaller than the number of turns Nb, and the number of turns Na of the upper coil and the number of turns Nb of the lower coil are set such that a lower coil resistance value is higher than an upper coil resistance value,
wherein the number of turns Na of the upper coil and the number of turns Nb of the lower coil are set according to a difference between the lower coil resistance value and the upper coil resistance value, and
an end point of winding of an i-th (where i=1 to N) upper coil is connected to a start point of the winding of an (i+1)th upper coil, and
an end point of the winding of an i-th (where i=1 to N) lower coil is connected to a start point of the winding of an (i+1) lower coil, and
wherein a lower coil wire diameter is identical to an upper coil wire diameter.

7. A DC commutator motor comprising:
a yoke;
a field magnet positioned at an inner peripheral side of the yoke;
an armature rotatably supported at an inner peripheral side of the field magnet with a gap therebetween;
a shaft positioned on a central axis of the armature;
a plurality of commutator segments positioned in a circumferential direction of the shaft;
a plurality of armature slots positioned on an outer periphery of the armature;
an upper coil wound the number of turns Na through two of the armature slots at an opening side of each of the two slots, the two of the armature slots being located apart from each other with the a predetermined number of armature slots therebetween; and
a lower coil connected in parallel with the upper coil, the lower coil being wound the number of turns Nb through the two of the armature slots at a bottom side of each of the two slots,
wherein the number of turns Na is smaller than the number of turns Nb, and the number of turns Na of the upper coil and the number of turns Nb of the lower coil are set such that a lower coil resistance value is higher than an upper coil resistance value,
wherein the sum of the number of turns Na and the number of turns Nb equals a sum value;
wherein a difference between the upper coil resistance value associated with the selected number of turns Na and the lower coil resistance value associated with the selected number of turns Nb is less than all possible differences in resistance values associated with other numbers of turns which have the same sum value, and
an end point of winding of an i-th (where i=1 to N) upper coil is connected to a start point of the winding of an (i+1)th upper coil, and
an end point of the winding of an i-th (where i=1 to N) lower coil is connected to a start point of the winding of an (i+1) lower coil, and
wherein a wire diameter of the upper coil is identical to a wire diameter of the lower coil.

* * * * *